United States Patent [19]

Ruesch

[11] 4,261,674

[45] Apr. 14, 1981

[54] GEAR CUTTING MACHINE AND METHOD

[75] Inventor: Erhard Ruesch, Zurich, Switzerland

[73] Assignee: Maag Gear-Wheel & Machine Company Limited, Zurich, Switzerland

[21] Appl. No.: 967,772

[22] Filed: Dec. 8, 1978

[30] Foreign Application Priority Data

Dec. 23, 1977 [CH] Switzerland ................ 15937/77

[51] Int. Cl.³ .................. B23F 1/04; B23F 3/00; B23F 15/00
[52] U.S. Cl. .................................. 409/3; 409/47
[58] Field of Search ............... 90/1.6 R, 8; 409/3, 409/2, 11, 47

[56] References Cited

U.S. PATENT DOCUMENTS

| | | | |
|---|---|---|---|
| 2,315,068 | 3/1943 | Matthews | 90/1.6 R X |
| 2,466,512 | 4/1949 | Sykes et al. | 409/11 |
| 3,096,685 | 7/1963 | Demuth | 409/3 |
| 3,732,780 | 5/1973 | Wydler et al. | 409/47 |
| 4,140,042 | 2/1979 | Demuth et al. | 90/1.6 R |

Primary Examiner—Z. R. Bilinsky
Attorney, Agent, or Firm—Werner W. Kleeman

[57] ABSTRACT

A gear cutting machine and method for fabricating workpieces, especially steering segments, for transmissions having a variable transmission ratio, wherein there takes place between the workpiece and a gear cutter or hob a part-rolling or generating movement composed of a generating rotation about the workpiece axis and a generating displacement transverse to the workpiece axis as well as a to-and-fro cutting movement along the workpiece axis. An additional movement, controlled by a template and directed transverse to the workpiece axis, alters the course of the generating curve of the workpiece. This additional movement controlled by the template constitutes a change of the work position of the gear cutter and which change is directed transverse to the generating displacement.

7 Claims, 2 Drawing Figures

GEAR CUTTING MACHINE AND METHOD

BACKGROUND OF THE INVENTION

The present invention relates to a new and improved method of, and apparatus for, fabricating workpieces, especially steering segments, for transmissions having a variable transmission ratio.

More specifically, the invention relates to a novel gear cutting machine and generating method for producing variable-ratio gearing, wherein between the workpiece and a gear cutter or hob there occurs a part-generating or rolling movement composed of a generating rotation about the workpiece axis and a generating displacement transverse to the workpiece axis as well as a to-and-fro cutting movement along the workpiece axis. Further, there is produced an additional or supplementary movement, controlled by a template, this additional movement being directed transversely with respect to the workpiece axis and altering the course of the generating curve of the workpiece.

With a state-of-the-art gear cutting machine of this type, as disclosed for instance in German Pat. No. 1,950,959, the additional or supplementary movement which is controlled by the template comprises a linear movement which occurs in or opposite to the direction of the generating displacement and which is superimposed upon such generating displacement and like the same is carried out by a generating slide or carriage together with a workpiece table mounted rotatably thereon for rotation about the workpiece axis. The inert mass of the generating slide or carriage together with the workpiece table and the workpiece is appreciable, and therefore it is difficult to accomplish the additional movement with an accuracy corresponding to the present day requirements of gear tooth systems, for instance for the steering transmissions of motor vehicles. This additional or supplementary motion is required in order to achieve a desired change of the course of the generating curve of the workpiece. By virtue of such difficulty the machining speed of the heretofore known gear hobbing machines must be limited in order that the unfavourable effect of the aforementioned inert masses upon the machining accuracy remains within acceptable limits. Consequently, limiting the machining or work speed constitutes an emergency solution, especially when machining workpieces, which like steering segments for motor vehicles, are fabricated in large numbers.

SUMMARY OF THE INVENTION

Therefore, with the foregoing in mind it is a primary object of the present invention to provide an improved method of and apparatus for producing variable-ratio gearing, such as for use in the steering segments for motor vehicles, which is not associated with the aforementioned drawbacks and limitations of the prior art proposals.

Another object of the present invention aims at the provision of a gear cutting machine of the previously mentioned type which is constructed in a manner such that it is possible to also accomplish at high machining speeds the requisite changes in the course of the generating curve of the workpiece with great accuracy.

Yet a further significant object of the invention and in keeping with the immediately preceding objective is to enable the machining operation to be accomplished at high speeds, with the ability to change the course of the generating curve of the workpiece, so that it is particularly possible to perform the conventional profile displacement of one or a number of intermediate teeth of steering transmissions.

Now in order to implement these and still further objects of the invention, which will become more readily apparent as the description proceeds, the present invention is manifested by the features that the additional movement which is controlled by the template constitutes a change of the work position of the gear cutter and which change is directed transversely with respect to the generating displacement.

In the case of standard gear cutting machines the mass moment of inertia is already maintained small because it is conventional to move the gear cutter or hob, at the end of each work stroke, away from the workpiece into a rest position, so that it does not contact the workpiece during the return stroke. It is for this reason that there do not occur any appreciable inertia forces when the work position of the gear cutter is altered according to the invention.

There is already known to the art, for instance from U.S. Pat. No. 2,856,823, a duplicating milling machine wherein there are milled or machined for instance elliptical gears by scanning an elliptical template. However, this machine does not work in accordance with a part-rolling or generating method, rather the workpiece is stationarily mounted and continuously rotates about its own axis while it is machined by a worm-like hob or gear cutter which is moved up and down parallel to the workpiece axis and can be advanced at right angles to the workpiece axis and controlled by the template in accordance with the elliptical shape. A generating displacement, as is typical for part-rolling or generating methods, is not accomplished.

As far as the inventive machine is concerned it is not decisive whether the components of the part-rolling movement, namely the generating rotation and the generating displacement, are both carried out by the workpiece or whether it is the gear cutter or hob which performs one of these movements or in fact both of them. Equally it is unimportant whether the to-and-fro cutting movement is performed by the gear cutter or the workpiece. With all such movements one is concerned with relative movements which can be distributed in different ways at the gear cutter and the workpiece.

The invention however advantageously constitutes a further development of features of the prior art species of gear cutting machine as disclosed in German Pat. No. 1,950,959, wherein the workpiece and the template are attached to a workpiece or machine table. For the generating rotation about the workpiece axis this workpiece table is rotatably mounted upon a generating slide or carriage which performs the generating displacement. Upon this generating slide there is mounted a feeler which scans the template and is likewise moveable transversely with respect to the workpiece axis. The gear cutter or hob is mounted at a cutting slide or carriage which is guided at an upright or stand to be displaceable parallel to the workpiece axis.

This known construction is advantageously further structured according to the invention in that the feeler is connected with a first guide rail extending in the direction of the generating displacement and mounted to be displaceable transversely thereto at the generating slide. The first guide rail can be scanned by a second feeler mounted at the stand. The second feeler is connected by means of an angular drive with a second guide rail extending in the direction of the cutting movement and guided transverse thereto at the stand or upright. The second guide rail, in turn, can be scanned by a third feeler which is mounted at the cutting slide or carriage, the third feeler being connected by a further angular drive with the gear cutter or hob.

The construction described heretofore can be easily installed at existing gear cutting machines of the previously described type, especially if the first feeler coacting directly with the template is connected with the first guide rail likewise by means of an angular drive which converts the relative movements of the first feeler, in relation to the generating slide, and caused by the template and extending transverse to the workpiece axis, into relative movements of the first guide rail in relation to the generating slide, and which relative movements are parallel to the workpiece axis.

As above indicated in the case of cutting machines it is generally conventional if the cutting tool is brought into a rest position for each return stroke. For this purpose in the case of gear cutting machines the gear cutter or hob is pivotable into the rest position about a pivot axis extending parallel to the direction of the generating displacement. The invention, while predicated upon this known construction, can be particularly easily constructed such that the change of the work position of the gear cutter, controlled by the template, causes a pivoting about the pivot axis in the direction of the rest position.

Additionally, it is advantageous if the feeler is biased towards the related template or guide rail, as the case may be, and one of the feelers can be raised from the template or guide rail by means of an adjustable stop or impact member.

Finally, by virtue of the teachings of the invention there are afforded additional possibilities for influencing the tooth shape or profile of the workpiece without additional expenditure in that at least one of the guide rails has a curve shape for applying an additional correction at the teeth of the workpiece.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
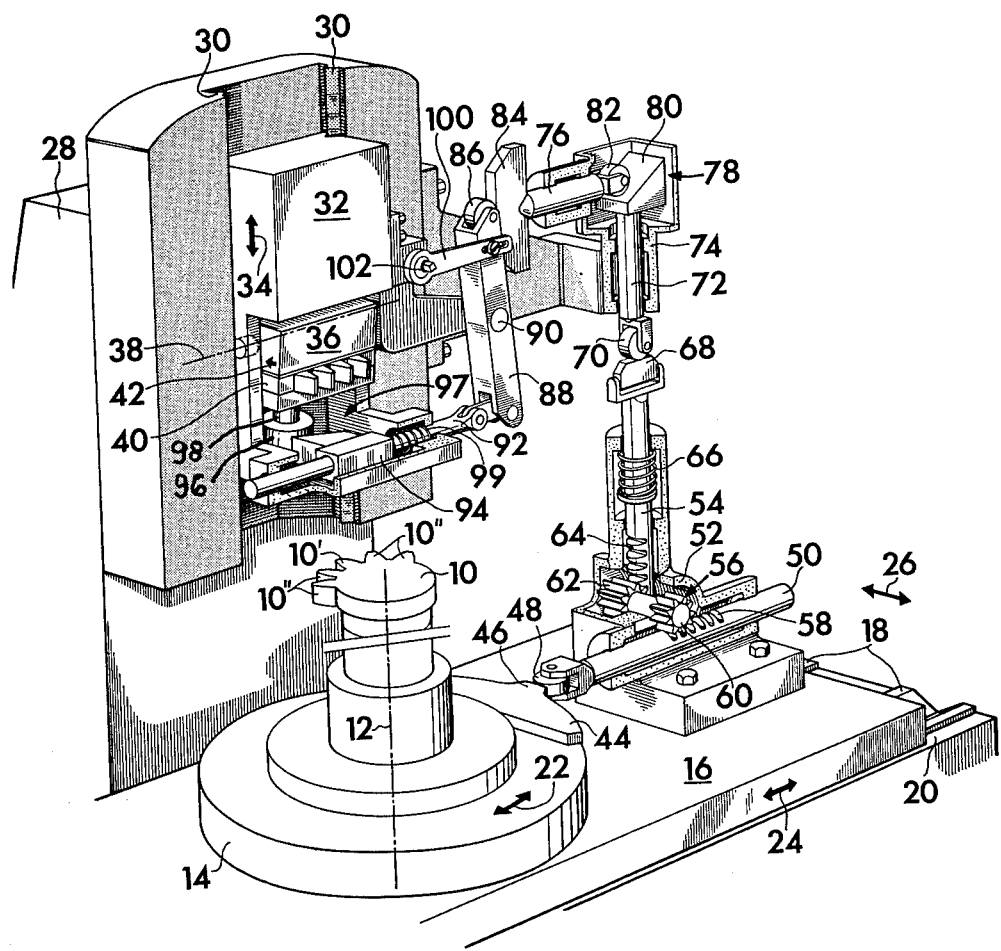
FIG. 1 is a perspective view of a first embodiment of gear cutting machine according to the invention.

Describing now the drawings, the gear hobbing machine illustrated therein in two exemplary embodiments, has the task of producing at a workpiece 10, for instance a steering segment, a gear tooth system having an intermediate tooth 10' and four (FIG. 1) or two (FIG. 2) further teeth 10". The intermediate tooth 10', in comparison to the remaining teeth 10", has a profile displacement which is directed away from the workpiece axis 12, as can be clearly seen in FIG. 2, and therefore the intermediate tooth 10' is thicker than the remaining teeth 10". Such gear tooth systems or gear teeth are standard at steering transmissions wherein when driving straight ahead they should have a more direct transmission ratio than when the wheels are markedly turned-in.

The workpiece 10 is secured to a workpiece or machine table 14 mounted to be rotatable at a generating slide or carriage 16 about the workpiece axis 12 which is vertical in both exemplary embodiments. The generating slide or carriage 16 is displaceably guided in both embodiments along horizontal guides 18 upon a sub-slide or carriage 20. Rotation of the workpiece table 14 in the direction of the double-headed arrow 22 will be designated in the description to follow as the generating rotation, whereas a linear displacement of the generating slide 16 in the direction of the double-headed arrow 24 will be designated in the description to follow as the generating displacement.

Figure 2:
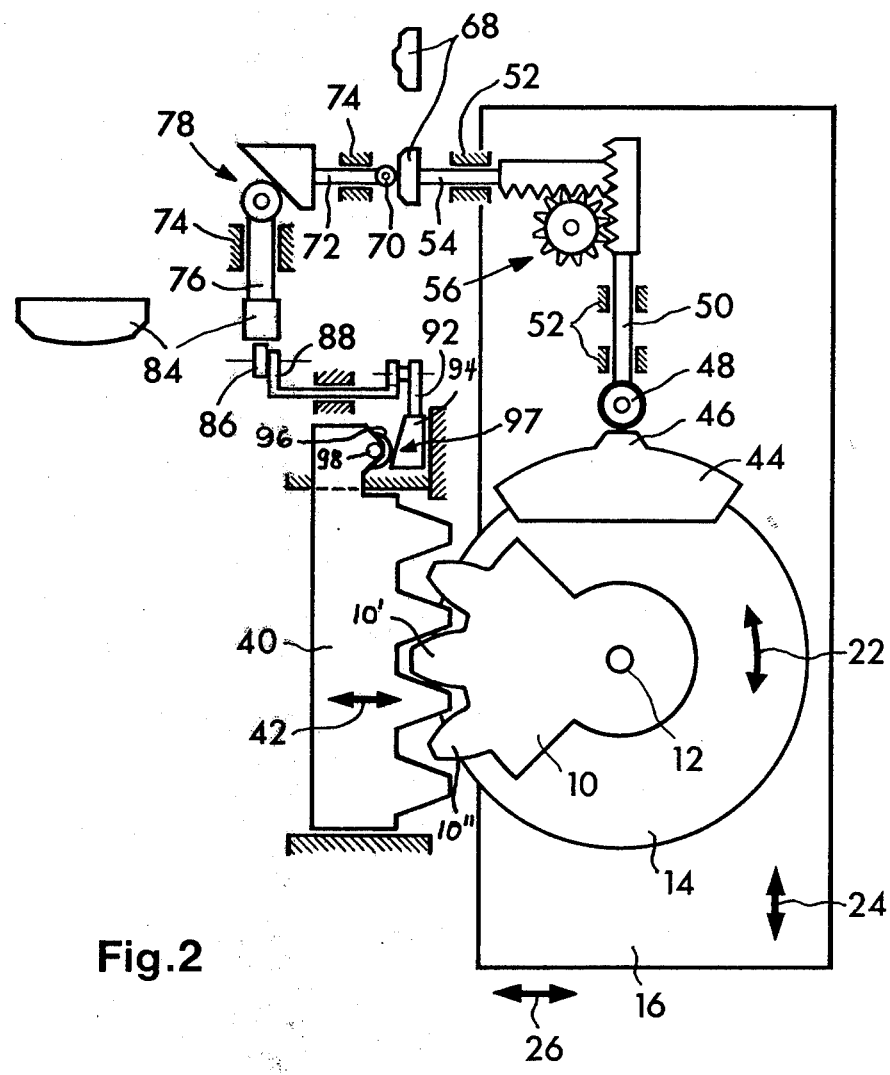
FIG. 2 is a markedly simplified top plan view of a second embodiment of the invention.

The sub-slide 20 which has been only schematically indicated in FIG. 1 and not particularly shown in FIG. 2 is constructed in such a manner that it can accomplish advancement movements 26 in relation to a stand or upright 28 and which movements extend at right angles to the direction of the generating displacement 24. The upright or stand 28 possesses vertical guides 30 at which there is displaceably guided a cutting slide or carriage 32. The movements of the cutting slide 32 along the guides 30 are designated hereinafter as the cutting movement 34.

Pivotably mounted at the cutting slide 32 is a hob or gear cutter-support 36 for movement about an horizontal pivot axis 38. This pivot axis 38 extends parallel to the direction of the generating displacement 24. A hob or gear cutter 40 is attached at the hob support or carrier 36. The movements which are accomplished by the gear cutter 40, upon rocking the hob or gear cutter-support 36 about the pivot axis 38, are referred to hereinafter as the additional or supplementary movement 42. The pivotal range of the gear cutter-support 36 is limited such that the additional movement 42 extends essentially at right angles to the workpiece axis 12.

Attached to the workpiece table 14 is a template 44 which has a projection 46 at its central or intermediate region. Traveling upon the template 44 is a roll or roller 48 which is mounted at a first feeler 50. This first feeler 50 is displaceably guided parallel to the direction of the generating displacement 24 in a first housing 52 attached at the generating slide 16. This first feeler 50 is connected by means of a first angular drive 56 with a plunger 54 displaceably guided in the same housing 52 at right angles to the first feeler 50.

With the exemplary embodiment shown in FIG. 1 the plunger 54 is vertically displaceable, in other words parallel to the workpiece axis 12 and with respect to the cutting motion or movement 34. On the other hand, with the embodiment of FIG. 2 the plunger 54 is displaceably guided at right angles not only with regard to the generating displacement 24, but also with respect to the workpiece axis 12 and the cutting movement 34.

With both exemplary embodiments the first angular drive 56 consists of a gear rack 58 formed at the first feeler 50, a first pinion 60 meshing with this gear rack 58 or equivalent structure and a second pinion 62 which is coaxial with respect to the first pinion 60 and rigidly connected therewith and meshes with a gear rack 64 or equivalent structure provided at the plunger 54. The plunger 54 is loaded or biased by a spring 66, only schematically shown in FIG. 1, in such a manner that it always strives to hold the first feeler 50 in contact with the template 44.

What is further common to both of the exemplary embodiments is that at the end of the plunger 54 which is remote from the angular drive 56 there is exchangeably secured a first guide rail 68 upon which travels a roll or roller 70. This roll 70 is mounted at a second feeler 72 which is displaceably guided parallel to the plunger 54, in other words vertically in the arrangement of FIG. 1, however in the arrangment of FIG. 2 horizontally, in a second housing 74 attached at the stand or upright 28. In the second housing 74, for both exemplary embodiments, there is guided a second plunger 76 for displacement parallel to the direction of the generating displacement 24. The second feeler 72 is connected with the second plunger 76 by means of an angular drive 78 or equivalent structure which, in both illustrated exemplary embodiments, is formed by an inclined guide body 80 attached to the second feeler 72 and a roll or roller 82 which travels thereon and is mounted at the second plunger 76.

At the end of the second plunger 76 which faces away from the angular drive 78 there is attached a second guide rail 84 which extends essentially in vertical direction. Traveling upon the second guide rail 84 is a roll or roller 86 which is mounted at a third feeler 88. In both exemplary embodiments this third feeler 88 is constituted by a double-armed lever which is mounted at the central region between both of its ends upon a pivot axis or shaft 90 attached to the cutting slide 32. With the arrangement of FIG. 1 the pivot shaft 90 extends at right angles to the workpiece axis 12 and with respect to the direction of the generating displacement 24, whereas on the other hand for the arrangement of FIG. 2 such pivot shaft 90 extends parallel to the workpiece axis 12.

The end of the tiltable or pivotable third feeler 88, and which end faces away from the roll 86, is hingedly connected with a rod 92 which is guided displaceably at the cutting slide 32 for movement parallel to the direction of the generating displacement 24 and carries an inclined or beveled guide body 94 upon which travels a roll or roller 96. This roll 96 is mounted to be rotatable at the gear cutter-carrier 36 upon an essentially vertical pivot shaft or pin 98 and forms in conjunction with the guide body 94 a third angular drive 97. This guide body 94 is loaded by a spring 99 or equivalent structure, which strives to retain the roll 86 in contact with the second guide rail 84.

According to the embodiment of FIG. 1 the tilting or pivotable motion of the third feeler 88 can be limited by means of a bracket-like stop or impact member 100 which is adjustably mounted at the cutting slide 32 by means of an eccentric 102.

Having now had the benefit of the foregoing discussion of the exemplary embodiments of gear cutting machines illustrated in FIGS. 1 and 2, there will be considered at this point the mode of operation thereof, which is as follows:

The generating rotation 22 and the generating displacement 24 are accommodated to one another by means of a not particularly illustrated, but conventional generating gearing, for instance a change-speed gearing as illustrated in U.S. Pat. No. 3,732,780, the disclosure of which is incorporated herein by reference, or by means of a likewise known generating gearing working with rolling blocks and tapes and both movements being derived from a common drive. Simultaneous with the generating rotation 22 and the generating displacement 24 there occurs a cutting movement 34 by means of which the cutting slide 32 is rapidly moved up and down. The gear cutter-carrier or support 36 together with the gear cutter or hob 40, during each downward movement, assumes a work position and during each upward movement, a rest position. This rest position is established by means of a not particularly illustrated but likewise known drive, for instance an electromagnetic or hydraulic drive, in that the gear cutter-carrier 36 is rocked away from the workpiece axis 12 about the pivot axis 38.

If during the course of the generating rotation the roll 48 of the first feeler 50 contacts the projection 46 of the template 44, then the first feeler 50 is moved in a direction away from the workpiece axis 12. As a result, there is accomplished a displacement of the first plunger 54 upwardly in the arrangement of FIG. 1 and to the left of the embodiment of FIG. 2. The first guide rail 68 is long enough in order to transmit this displacement, independent of the position of the generating slide 16, to the second feeler 72, so that the second angular drive 78 causes an appropriate displacement of the second plunger 76 parallel to the direction of the generating displacement 24. The second guide rail 84 is long enough in order to convert this last-mentioned displacement, independent of the position of the cutting slide 32, into a pivotal or tilting movement of the third feeler 88 about the pivot shaft 90. This pivotal movement causes a displacement of the guide body 94, which, in turn, by means of the roll 96 brings about a rocking of the gear cutter-carrier 36 about the pivot shaft 38. This pivoting movement means that the gear cutter 40 carries out an additional or supplementary movement 42 which is directed away from the workpiece axis 12. With the downwardly directed work strokes of the hobbing slide 32, and which follow this additional movement, there is formed the intermediate tooth 10' with a positive profile displacement which is directed away from the workpiece axis 12.

As previously indicated, there are afforded additional possibilities for influencing the tooth shape or profile of the workpiece without additional expenditure in that at least one of the guide rails, such as shown in FIG. 2 for the guide rails 68 and 84, has a curve shape for applying an additional correction at the teeth of the workpiece.

While there are shown and described present preferred embodiments of the invention, it is to be distinctly understood that the invention is not limited thereto, but may be otherwise variously embodied and practiced within the scope of the following claims, ACCORDINGLY,

What I claim is:

1. A method of operating a gear cutting machine having a table for carrying a workpiece and gear cutter mounting means and means for producing a relative generating motion between a gear cutter on said mounting means and said workpiece that includes generating a normal generating motion and an additional motion in order to generate on said workpiece at least one tooth having a variable tooth thickness for use as steering segments and including the steps of mounting said workpiece table upon a carrier which is rotatably mounted for rotational displacement of the workpiece about a workpiece axis, said carrier being mounted on a slide means for linear displacement of the table and workpiece, mounting said gear cutter on said mounting means so as to enable a to-and-for cutting movement by said gear cutter along the workpiece axis and further mounting said gear cutter to be swingable to a rest position about a swinging axis, the improvement comprising the steps of:

providing said rotating workpiece table with template means;

generating said additional motion by engaging said template means with a follower assembly means which follower assembly means also contacts said gear cutter;

said additional motion being directed transverse to the workpiece axis and perpendicular to the normal generating motion; and swinging said gear cutter in response to the transmitted motion of said rotating workpiece table about said swinging axis in a direction towards said rest position.

2. In a gear cutting machine having a table for carrying a workpiece and gear cutter mounting means, means producing a relative generating motion between a gear cutter on said mounting means and said workpiece that includes normal generating motion and an additional motion in order to generate on said workpiece at least one tooth having a variable tooth thickness for use as steering segments and including a rotatable carrier upon which the workpiece table is mounted for rotational displacement of the workpiece about a workpiece axis, said carrier being mounted on slide means for linear displacement of the table and workpiece, said gear cutter mounting means including means for enabling a to-and-fro cutting movement by said gear cutter along the workpiece axis and means for enabling said gear cutter to be swingable to a rest position about a swinging axis, the improvement comprising:

template means mounted on said carrier follower assembly means engaging said template means and contacting said gear cutter for generating said additional motion directed transverse to said workpiece axis and perpendicular to said normal generating motion in response to the rotation of said workpiece table; and said additional motion comprises a change of the work position of said gear cutter directed to said rest position.

3. The gear cutting machine as defined in claim 2, wherein:

said means for carrying out said normal-generating motion comprising:

a workpiece table at which there are supported the workpiece and the template;

a generating slide carrying out the normal generating motion;

said workpiece table being rotatably mounted at the generating slide in order to perform a generating rotation about the workpiece axis;

said means supporting said gear cutter comprising a cutting slide at which there is mounted the gear cutter;

upright means for supporting the cutting slide for displacement essentially parallel to the workpiece axis;

said follower assembly means for producing said additional generating motion comprising:

a first feeler scanning said template and moveably mounted at the generating slide for movement transversely with respect to the workpiece axis;

a first guide rail extending in the direction of the generating displacement and adjustable transversely thereto, said first guide rail being mounted at the generating slide;

means for operatively connecting the first feeler with said first guide rail;

a second feeler mounted at the upright means for scanning said first guide rail;

a second guide rail extending in the direction of the cutting movement and guided for movement transversely thereto at the upright means;

angular drive means for connecting said second feeler with said second guide rail;

a third feeler for scanning said second guide rail;

said third feeler being mounted at the cutting slide; and a further angular drive means for connecting the third feeler with the gear cutter.

4. The gear cutting machine as defined in claim 3, wherein:

said operatively connecting means comprising an additional angular drive means for connecting the first feeler which directly cooperates with the template with the first guide rail;

said additional angular drive means converting the relative movements of the first feeler in relation to the generating slide, and which relative movements extend transversely with respect to the workpiece axis and are brought about by the template, into relative movements, which are parallel to the workpiece axis, of the first guide rail in relation to the generating slide.

5. The gear cutting machine as defined in claim 2, wherein:

said follower assembly means for producing said additional generating motion comprising means for pivoting the gear cutter about a pivot axis extending essentially parallel to the direction of the normal generating displacement into a rest position;

the change of the work position of the gear cutter which is controlled by the template constituting a pivoting movement about said pivot axis in the direction of the rest position.

6. The gear cutting machine as defined in claim 3, further including:

means for biasing each of the feelers against its related template or guide rail; and an adjustable stop means for raising one of the feelers from its related template or guide rail.

7. The gear cutting machine as defined in claim 3, wherein:

at least one of the guide rails possesses a curve shape configured for applying an additional correction to the teeth of the workpiece.

* * * * *